July 16, 1968

A. LENNING 3,393,283

LIQUID LEVEL SWITCH WITH A TWO-PIECE FLOAT BODY OF
FLEXIBLE MATERIAL WITH A TWO-PIECE
RIGID LINER MEMBER

Filed March 29, 1966

INVENTOR.
ALVAR LENNING
BY *Darby & Darby*

ATTORNEYS

United States Patent Office 3,393,283
Patented July 16, 1968

3,393,283
LIQUID LEVEL SWITCH WITH A TWO-PIECE
FLOAT BODY OF FLEXIBLE MATERIAL
WITH A TWO-PIECE RIGID LINER MEMBER
Alvar Lenning, Stockholm, Sweden, assignor to Inreco
AB, Stockholm, Sweden, a Swedish Company
Filed Mar. 29, 1966, Ser. No. 538,364
3 Claims. (Cl. 200—84)

ABSTRACT OF THE DISCLOSURE

A liquid level indicator of the float type, which due to the provision of a rubber housing having a rigid liner, is not only resistant to attack by liquids in which the float may be placed, but is at the same time resistant to the external liquid pressures which may be exerted, particularly when the float is used in a deep tank. The float carries within it a three-electrode switch of the mercury type, adapted to close one of two circuits to thereby indicate that the liquid is below a predetermined range or that it is above that range, and of course by lack of active indication also when the level is within the predetermined range.

---

My invention relates to electric float type level indicators to be used in conjunction with liquid reservoirs such as water towers, sewage sumps, oil tanks etc.

The general type of indicator with which we are here concerned comprises a more or less cylindrical float bulb which is kept suspended from a flexible electric cable attached to one end of the float. Adjacent to the junction between cable and float a weight is provided—attached either to the cable or to the float bulb itself; in the latter case the weight may be arranged inside the float bulb, close to the cable entry. Inside the float bulb a switching device (preferably a mercury type switch) is provided which is connected to the cable and produces a switching action as the float bulb is being tilted from a vertical into a horizontal, or inverted, position. Such a tilting will obviously take place as the liquid in the tank passes the suspension level of the float bulb, upwardly or downwardly.

Heretofore devices of this type have been made either of vulcanized rubber or the like (for shallow tanks exerting low pressure at the bottom level) or of cast hollow metal (aluminum, for large depth tanks exerting higher pressure). The all-rubber types are usually made integral with the cable insulation, hence are inherently tight. They are, however, susceptible to deformation, or collapse, if used in oil tanks etc., since no rubber compound—either natural or synthetic—is fully inert to gasoline, fuel oils, or fatty oils. Metallic float bodies, on the other hand, present certain difficulties with regard to keeping the cable junction, and the switch entry, durably tight. They are, furthermore, rather expensive.

According to my invention the float is built in a way which combines the best properties of the metallic and pure rubber floats. One characteristic feature is that the whole bulb exterior is made entirely of an oil resistive rubber compound (or generally of a high class elastomer) which maintains the float liquid tight, whereas the interior of the bulb wall is made of a harder material (aluminum, hard plastic) capable of withstanding substantial external pressure. In this way the outside wall may be made with a thinner gauge rubber, the corresponding saving minimizing the cost increment attributable to the introduction of the harder sleeve or liner member. The liner need not be liquid tight, and it is not necessary to make it cover all inside areas of the jacket wall, it may even be perforated or shaped like a closely wound spiral.

The invention will be more fully explained in conjunction with the accompanying drawing in which.

Figure 1:
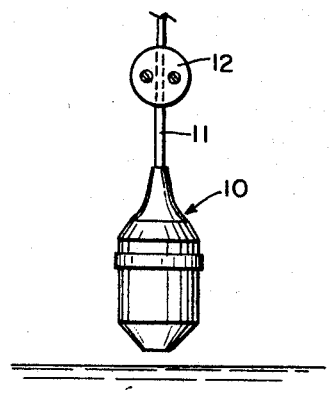
FIG. 1 is a side elevational view of the device when the level in the tank is very low.
Figure 2:
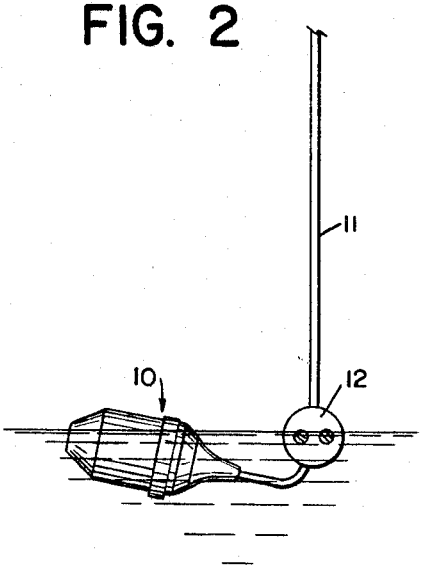
FIG. 2 is a view similar to FIG. 1 but showing the float in position when the tank is filled slightly above the predetermined level.

Referring now to FIGS. 1 and 2, it will be seen that in the former the float 10 is suspended above the liquid whereas in FIG. 2 the float tilts sideways, causing a switching action in a mercury switch enclosed (not shown). In both figures a weight 12 serves to maintain a tension in the cable at all times. It keeps the float from remaining on the surface as the liquid rises above the weight level.

Figure 3:
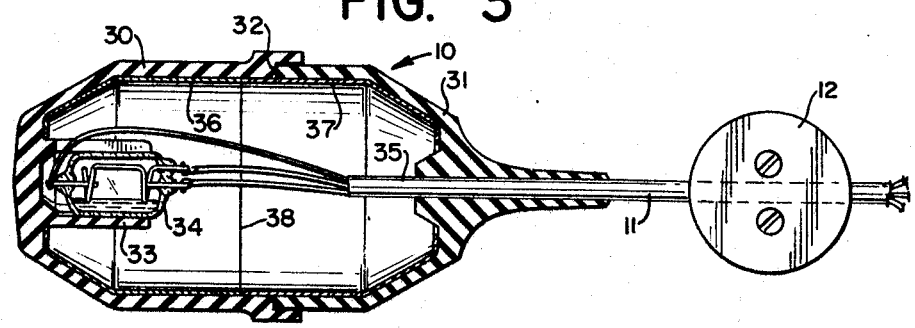
FIG. 3 is a longitudinal cross-sectional view of one embodiment of the invention.

As shown in FIG. 3 the float member 10 comprises a housing formed of two parts 30, 31, each made of a conventional device including a rubber compound. The two portions are joined at 32, preferably by the aid of a low temperature vulcanizing paste. Member 31 is made with an integral holder or sleeve 33 for a mercury switch 34 having 3 electrodes. Each of said electrodes is connected to a conductor in an electric cable 35 the insulating sheath of which is vulcanized into a sleeve formed integrally with member 31.

Before assembling the rubber housing parts 30, 31, two cups 36, 37 made of thin gauge aluminum, or of a hard plastic compound such as Bakelite, are inserted; these cups when the housing parts are fitted together butt against each other at 38, i.e. at a predetermined longitudinal distance from the junction 32 of parts 30, 31. This arrangement facilitates the assembly and keeps the cups properly aligned.

Figure 4:
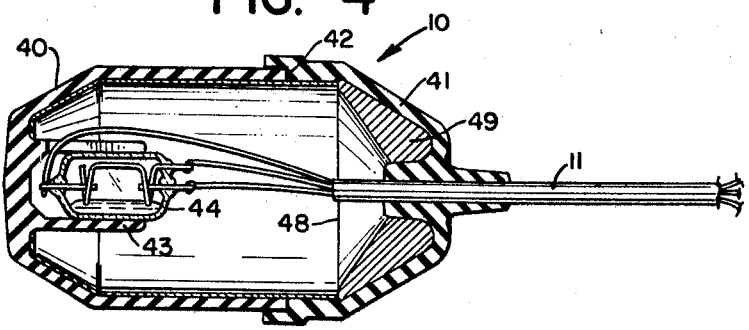
FIG. 4 is a similar longitudinal cross-sectional view of a second embodiment of the invention.

In the embodiment shown in FIG. 4 the rubber housing members are designated 40, 41 and their lateral junction 42; numeral 43 designates a holder for the mercury switch, 44. The arrangement shown in FIG. 4 differs insofar from that in FIG. 3 in that there is no external weight attached to the cable. In lieu of this an internal weight 49 is provided; it may be made of lead or cast iron or the like, and is situated rather close to the extreme end of the structure in order to assure that the float will tilt when submerged. This internal weight is, according to the invention, made to serve also as part of the liner the remainder of which will then constitute a single cup, if one so desires. It butts at 48 against the edge portion of the weight member 49, leaving—prior to the jacket assembly—an exposed peripheral portion the length of which equals the distance between 42 and 48.

In a device of the class described low weight is a prime requisite. Other important requisites are tightness against a wide variety of fluids, durability, adequate stiffness against external pressure, and low cost. All five of these design requirements will be attainable at the same time, by the aid of the invention.

I claim:

1. An electric liquid level indicator of the float type comprising, in combination, a float body having a first cylindrical housing member of relatively flexible corrosion-resistant material, including a cup-shaped end having an inwardly extending sleeve centrally thereof; a second cylindrical housing member of relatively flexible corrosion-resistant material, including a cup-shaped end having an inwardly extending hollow sleeve centrally thereof; a first liner member of rigid pressure-resistant material having an inturned annular ring extending about the sleeve of said first housing member, said liner being of different overall length than the length of said first housing member; a second liner member of relatively rigid pressure-resistant material having an annular portion extending about said second sleeve; said second liner member being of different axial extent than said second housing member, said first and second lining members abutting against each other, one of said housing members having a peripheral annular shoulder at the end thereof, the other housing member having its end seating within said shoulder, said first and second housing members being sealed together to form a liquid tight enclosure, a mercury switch held in the sleeve of said first housing member and an electrical cable sealed into and passing through said second housing member sleeve, the conductors of said cable being connected to said mercury switch.

2. An electric liquid level indicator as claimed in claim 1, characterized in that said second liner member is formed of heavy material, thus assuring tilting of the float when partially or fully submerged in liquid.

3. An electric liquid level indicator as claimed in claim 1, wherein said mercury switch comprises a common electrode and two individual electrodes whereby said indicator is adapted to complete selectively, circuits from a common power source to individual indicators to indicate when the liquid level rises above or falls below a predetermined level range.

References Cited

UNITED STATES PATENTS

| | | | |
|---|---|---|---|
| 1,727,525 | 9/1929 | Thompson et al. | 73—322.5 X |
| 2,600,659 | 6/1952 | Koch | 200—84 |
| 3,183,323 | 5/1965 | Englesson | 200—84 |

BERNARD A. GILHEANY, *Primary Examiner.*

H. A. LEWITTER, *Assistant Examiner.*